(12) United States Patent
Jutila et al.

(10) Patent No.: US 10,126,448 B2
(45) Date of Patent: Nov. 13, 2018

(54) FORMATION MEASUREMENTS USING DOWNHOLE NOISE SOURCES

(71) Applicants: Heikki Armas Jutila, Aberdeen (GB); Pierre-Francois Roux, Saint-Pierre-lès-Nemours (FR); Atul H. Kshirsagar, Aberdeen (GB); Arijit Chattopadhyay, Aberdeen (GB); Kousha Gohari, Aberdeen (GB); Carlos Mascagnini, Aberdeen (GB); Peter J. Kidd, Forfar (GB)

(72) Inventors: Heikki Armas Jutila, Aberdeen (GB); Pierre-Francois Roux, Saint-Pierre-lès-Nemours (FR); Atul H. Kshirsagar, Aberdeen (GB); Arijit Chattopadhyay, Aberdeen (GB); Kousha Gohari, Aberdeen (GB); Carlos Mascagnini, Aberdeen (GB); Peter J. Kidd, Forfar (GB)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 357 days.

(21) Appl. No.: 15/133,454

(22) Filed: Apr. 20, 2016

(65) Prior Publication Data

US 2017/0307772 A1  Oct. 26, 2017

(51) Int. Cl.
*G01V 1/30* (2006.01)
*G01V 1/50* (2006.01)
(Continued)

(52) U.S. Cl.
CPC .............. *G01V 1/303* (2013.01); *G01V 1/308* (2013.01); *G01V 1/42* (2013.01); *G01V 1/50* (2013.01);
(Continued)

(58) Field of Classification Search
None
See application file for complete search history.

(56) References Cited

U.S. PATENT DOCUMENTS 6,714,867 B2   3/2004   Meunier
6,795,373 B1   9/2004   Aronstam
(Continued)

OTHER PUBLICATIONS

Stehly et al., "Reconstructing Green's function by correlation of the coda of the correlation (C3) of ambient seismic noise" Journal of Geophysical Research, vol. 113, B11306, doi:10.1029/2008JB005693, 2008.*
(Continued)

*Primary Examiner* — John Kuan
(74) *Attorney, Agent, or Firm* — Cantor Colburn LLP

(57) ABSTRACT

A method of performing measurements of an earth formation includes disposing at least a first receiver and a second receiver in one or more monitoring boreholes in a formation, and injecting fluid into the formation from an injection borehole, wherein injecting includes operating a fluid control device to generate seismic and/or acoustic noise having an identifiable characteristic. The method also includes detecting seismic and/or acoustic signals at the first receiver and detecting seismic and/or acoustic signals at a second receiver, the seismic and/or acoustic signals corresponding to the seismic and/or acoustic noise, calculating an estimate of a Green's function between the first receiver and the second receiver by processing seismic and/or acoustic waves detected by the first receiver and the second receiver to at least partially reconstruct the Green's function, and estimating variations in a velocity of a region of the formation by determining variations in the reconstructed Green's function.

20 Claims, 11 Drawing Sheets

(51) Int. Cl.
*G01V 1/42* (2006.01)
*E21B 43/16* (2006.01)

(52) U.S. Cl.
CPC .... *E21B 43/162* (2013.01); *G01V 2210/1214* (2013.01); *G01V 2210/1234* (2013.01); *G01V 2210/1429* (2013.01); *G01V 2210/30* (2013.01); *G01V 2210/675* (2013.01)

(56) References Cited

U.S. PATENT DOCUMENTS

| | | | |
|---|---|---|---|
| 2010/0155058 A1 | 6/2010 | Gordy et al. | |
| 2011/0022321 A1* | 1/2011 | Hulden | G01V 1/30 702/14 |
| 2012/0106292 A1* | 5/2012 | Fuller | G01V 1/42 367/27 |
| 2013/0041589 A1 | 2/2013 | Auger | |
| 2013/0131990 A1 | 5/2013 | De Cacqueray et al. | |
| 2014/0182842 A1 | 7/2014 | Dutta et al. | |
| 2015/0198028 A1 | 7/2015 | Ahyi et al. | |

OTHER PUBLICATIONS

Campillo, et al.; "Long-Range Correlations in the Diffuse Seismic Coda"; (2003) Science vol. 299; 3 pages.

Gouedard, et al.; Convergence of the two-point correlation function toward the Green's function in the context of a seismic-prospecting data set;(2008); Geophysics, vol. 73, No. 6.; 7 pages.

Gret, et al.; "Time-lapse monitoring of rock properties with coda wave interferometry"; Mar. 2006;Journal of Geophysical Research; Retrieved from the internet; URL:https://www.researchgate.net/publication/215754864, 12 pages.

Hadziioannou, et al.; "Stability of Monitoring Weak Changes in Multiple Scattering Media with Ambient Noise Correlation: Laboratory Experiments"; (2009); Stability of noise-based correlation monitoring; 10 pages.

Hillers, et al.; "Noise-based monitoring and imaging of aseismic transient deformation induced by the 2006 Basel reservoir stimulation"; Geophysics, vol. 80, No. 4 (Jul.-Aug. 2015); pp. KS51-KS68.

Slob, et al.; "Interferometric electromagnetic Green's Functions Representations using Propagation Invariants"; Geophysical Journal International; Mar. 2007; Retrieved from the internet; URL https://www.researchgate.net/publication/227716060; 23 pages.

Snieder, et al.; "Coda Wave Interferometry for Estimating NonLinear Behavior in Seismic Velocity"; Science; Apr. 2002; Retrieved from the internet, URL:https://www.researchgate.net/publication/11454493, 4 pages.

Wapenaar, et al.; "Chaos Tamed"; Jun. 2007;vol. 447, Nature Publishing Group; 1 page.

Wapennar, et al.; "From order to disorder to order: a philosophical view on seismic interferometry";Retrieved from the internet; URL:http://geodus1.ta.tudelft.nl/PrivatePages/C.P.A.Wapenaar/6_Proceedings/Soc.Expl.Geoph/Seg_07a.pdf; 5 pages, available with Applicant on Aug. 21, 2017.

Weaver, et al.; "Ultrasonics without Source: Thermal Fluctuation Correlations at MHZ Frequencies"; (2001); Physical Review Letters; vol. 87, No. 13; 4 pages.

International Search Report and the Written Opinion of the International Searching Authority; PCT/US2017/026131; Korean Intellectual Property Office; dated Jul. 18, 2017; 14 pages.

* cited by examiner

FORMATION MEASUREMENTS USING DOWNHOLE NOISE SOURCES

BACKGROUND

Hydrocarbon exploration and energy industries employ various systems and operations to accomplish activities including drilling, formation evaluation, stimulation and production. Various measurement techniques may be employed to facilitate hydrocarbon exploration and production activities. For example, acoustic or seismic measurement operations are utilized to estimate formation properties.

SUMMARY

An embodiment of a method of performing measurements of an earth formation includes disposing at least a first receiver and a second receiver in one or more monitoring boreholes in an earth formation, the first receiver and the second receiver configured to detect at least one of seismic signals and acoustic signals, and injecting fluid into the earth formation from an injection borehole in the earth formation during an energy industry operation, wherein injecting includes operating a fluid control device to generate seismic and/or acoustic noise having an identifiable characteristic. The method also includes detecting seismic and/or acoustic signals at the first receiver and detecting seismic and/or acoustic signals at a second receiver, the seismic and/or acoustic signals corresponding to the seismic and/or acoustic noise, calculating an estimate of a Green's function between the first receiver and the second receiver by processing seismic and/or acoustic waves detected by the first receiver and the second receiver to at least partially reconstruct the Green's function, estimating variations in a velocity of a region of the formation by determining variations in the reconstructed Green's function, and evaluating the energy industry operation based on the estimated velocity.

An embodiment of a system for performing measurements of an earth formation includes a fluid control device configured to control injection of fluid into an earth formation from an injection borehole as part of an energy industry operation, the fluid control device configured to be operated to generate seismic and/or acoustic noise having an identifiable characteristic, and a processing device configured to perform receiving seismic and/or acoustic signals detected during the energy industry operation by a first receiver and a second receiver disposed in one or more monitoring boreholes in the earth formation, the seismic and/or acoustic signals corresponding to the seismic and/or acoustic noise, and calculating an estimate of a Green's function between the first receiver and the second receiver by processing seismic and/or acoustic waves detected by the first receiver and the second receiver to at least partially reconstruct Green's function. The processing device is also configured to perform estimating variations in a velocity of a region of the formation by determining variations in the reconstructed Green's function; and evaluating the energy industry operation based on the velocity.

BRIEF DESCRIPTION OF THE DRAWINGS

The following descriptions should not be considered limiting in any way. With reference to the accompanying drawings, like elements are numbered alike.

DETAILED DESCRIPTION

The systems and methods described herein provide for estimating earth formation properties using seismic and/or electromagnetic measurements. An embodiment of a measurement device or system includes one or more seismic or acoustic receivers disposed in a monitoring borehole that are configured to measure waves, such as seismic or acoustic waves, that are generated by one or more sources of noise in an injection borehole. The noise sources may be passive noise sources generated by injection of fluid into the injection borehole, or active sources such as control valves that can be operated by a controller and actuated to generate noise signals having identifiable characteristics.

In one embodiment, noise signals detected by at least a first receiver and a second receiver are analyzed to estimate a seismic or electromagnetic Green's function. The systems and methods described herein may be used to estimate formation properties (e.g., propagation velocity, saturation, etc.) and monitor stimulation and/or production by tracking fluid flow into and from the formation.

Examples of noise sources include injections of fluid (e.g., liquid and/or gas) into a formation, which can be monitored during production. For example, injection of fluid (e.g., steam, gas, or chemical injections) as part of an improved oil recovery (IOR) or enhanced oil recovery (EOR) procedure is monitored and noise generated by the injection is measured for use in Green's function retrieval. Such measurements, which can be performed in real time or near-real time, may be used to modify an injection schedule and maximize production. Another example of a noise source is ambient seismic noise, e.g., waves generated by microseismic activity induced by fluid injection and/or fluid migration.

Figure 1:
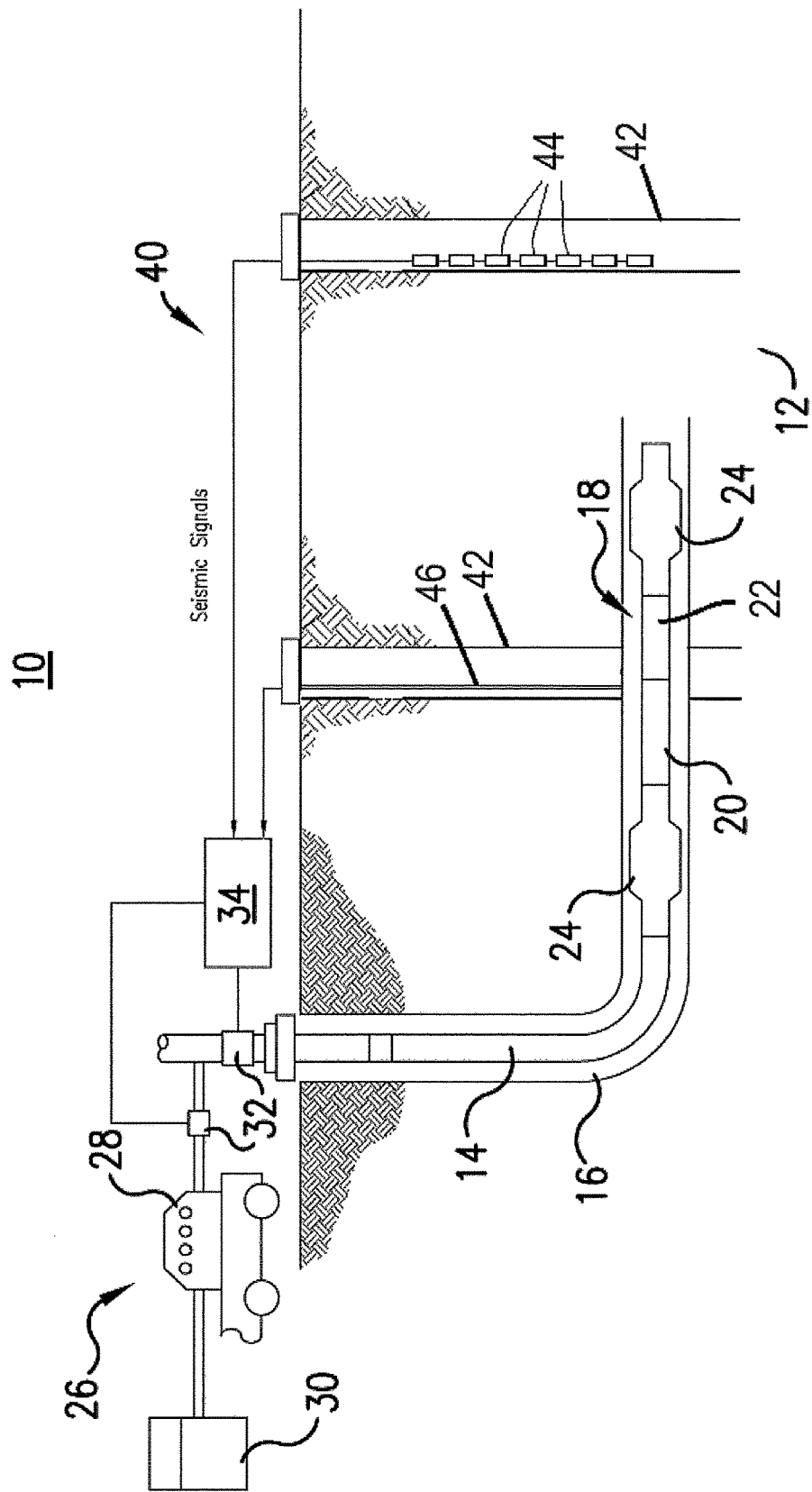
FIG. 1 depicts an embodiment of a hydrocarbon production and/or stimulation system, and a seismic monitoring system.

Referring to FIG. 1, an embodiment of a hydrocarbon production, stimulation and/or measurement system is described. The system 10 includes a stimulation and/or production system that performs various operations that include injection of fluid into an injection borehole 16 in an earth formation 12. An "injection borehole" may be any borehole in which fluid is injected as part of a downhole operation. The system 10 also includes a seismic measurement system 40 operable in conjunction with a monitoring borehole in the formation 12 or in another subterranean region or location.

The system 10 and embodiments of the various systems, devices and methods described herein may be used in a variety of energy industry operations. Examples of energy industry operations include downhole measurement operations (e.g., seismic surveys), production operations and treatment or stimulation operations. During such operations, fluid and other materials may be injected in a borehole for purposes such as drilling, stimulating a formation (e.g., hydraulic fracturing) and for production purposes (e.g., gas lift). For example, stimulation operations may involve injecting stimulation fluid in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers and others. Production and stimulation operations include, for example, hydraulic fracturing, stimulation, tracer injection, cleaning, acidizing, steam injection, water flooding, cementing, etc.

In the embodiment of FIG. 1, a borehole string 14 is configured to be disposed in a borehole 16 that penetrates the formation 12. The borehole 16 may be an open hole, a cased hole or a partially cased hole. In one embodiment, the borehole string 14 is a stimulation or injection string that includes a tubular, such as a coiled tubing, pipe (e.g., multiple pipe segments) or wired pipe, that extends from a wellhead at a surface location (e.g., at a drill site or offshore stimulation vessel). As described herein, "string" refers to any structure or carrier suitable for lowering a tool or other component through a borehole or connecting a drill bit to the surface, and is not limited to the structure and configuration described herein. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHAs and drill strings.

In one embodiment, the system 10 is configured as a fluid injection system. The fluid injection system may be used for a number of purposes, such as stimulation (e.g., hydraulic fracturing) and production. A fluid may be any flowable substance such as a liquid or a gas, and/or a flowable solid such as sand. In this embodiment, the string 14 includes an injection assembly 18 that includes one or more tools or components to inject fluid into the formation 12. For example, the string 14 includes an injection device 20 such as a fracture or "frac" sleeve. Additional components may be included such as a perforation assembly 22. The string 14 may also include one or more isolation or packer subs 24.

One or more of the injection assembly 18, the injection device 20, the perforation assembly 22 and/or packer subs 24 may or be connected to suitable electronics or processors configured to communicate with a surface processing unit and/or control the respective tool or assembly.

In one embodiment, an injection system 26 is employed to inject fluids into the borehole 16 and/or the formation 12. The injection system 26 includes an injection device such as a high pressure pump 28 in fluid communication with a fluid tank 30, mixing unit or other fluid source or combination of fluid sources. The pump 28 injects fluid into the string 14 or the borehole 16 to introduce fluid into the formation 12, for example, to stimulate and/or fracture the formation 12. The pump 28 may be located downhole or at a surface location.

One or more flow rate and/or pressure sensors 32 are disposed in fluid communication with the pump 28 and the string 14 for measurement of fluid characteristics. The sensors 32 may be positioned at any suitable location, such as proximate to (e.g., at the discharge output) or within the pump 28, at or near the wellhead, or at any other location along the string 14 or the borehole 16. The sensors described herein are exemplary, as various types of sensors may be used to measure various parameters.

A processing and/or control unit 34 is disposed in operable communication with the sensors 32 and the pump 28. The processing and/or control unit is configured to receive, store and/or transmit data generated from the sensors 32 and/or the pump 28, and includes processing components configured to analyze data from the pump 28 and the sensors, provide alerts to the pump 28 or other control unit and/or control operational parameters. The processing and/or control unit 34 includes any number of suitable components, such as processors, memory, communication devices and power sources.

In one embodiment, a seismic and/or acoustic monitoring system 40 is included as part of the system 10 and/or employable in conjunction with the system 10. The monitoring system 40 includes seismic and/or acoustic transducers or receivers disposed in one or more monitoring boreholes 42 (e.g., an injector, producer and/or observation borehole) and configured to receive seismic signals and convert them to electrical or optical signals for transmission and/or recording. For example, one or more discrete seismic receivers 44 are arrayed along one or more monitoring boreholes 42. In the art, such discrete seismic receivers may also be referred to as geophones. The receivers may also include a distributed measurement system such as a distributed acoustic system (DAS), which includes at least one DAS optical fiber 46 disposed along a monitoring borehole 42. The receivers may be placed in any suitable location or configuration relative to the formation or a formation region in which fluid injection is to be performed. Such fluid injection may be, e.g., IOR/EOR liquid or gas injection or any other fluid injection for facilitating production, or a stimulation or re-stimulation. The receivers are coupled to a data logger or other processor that is configured to record a signal magnitude as a function of time for each of the receivers. Functions of the data logger may be performed by a processor or processing unit such as the control unit 34.

The monitoring system 40 may be employed to detect, measure and analyze any type of energy wave that can be generated by noise sources described herein. In one embodiment, the waves are body waves that propagate through the formation and formation fluid. Waves that can be detected include ballistic, body waves, and scattered waves or multiply scattered waves. Other types of waves that can be detected and analyzed include surface waves and/or tube waves that propagate along a borehole or borehole string. As described further below, signals corresponding to waves generated by noise sources may be analyzed to estimate properties such as velocity, which can be used to estimate formation properties such as permeability, porosity, fluid saturation, etc. In embodiments discussed below, the waves are described as acoustic and/or seismic waves, however the embodiments are applicable to any type of wave that can be generated by noise sources and measured to estimate formation properties.

Various sensing or measurement devices may be included in the system 10, in downhole and/or surface locations. For example, one or more parameter sensors (or sensor assemblies such as LWD subs) are configured for formation evaluation measurements relating to the formation, borehole, geophysical characteristics and/or borehole fluids.

These sensors may include formation evaluation sensors (e.g., resistivity, dielectric constant, water saturation, porosity, density and permeability), sensors for measuring geophysical parameters (e.g., wave velocity and travel time), and sensors for measuring borehole fluid parameters (e.g., viscosity, density, clarity, rheology, pH level, and gas, oil and water contents).

A processor or combination of processors, such as the control unit 34, is configured to receive seismic or acoustic signals generated by or as a result of injection of fluid into the injection borehole 16, and estimate properties of the formation and/or fluid in the formation.

Noise caused by injection of fluid into the borehole 16 and/or the formation 12 is utilized as an acoustic and/or seismic source for performing acoustic and/or seismic measurements. Such measurements may include passive measurements (e.g., microseismic measurements) and/or active seismic measurements. Passive seismic measurements entail detection and measurement of seismic and/or acoustic signals generated in the formation as a result of activities or actions performed for other purposes, such as hydraulic fracturing or stimulation purposes. Passive signals are not purposefully induced as part of seismic and/or acoustic measurement, but are nonetheless used by a measurement system. Active measurements involve purposefully inducing seismic and/or acoustic signals in the formation for the purposes of seismic and/or acoustic measurement. It is noted that a measurement operation or method described herein may involve exclusively passive measurements, exclusively active measurements, or a combination of active and passive measurements.

For example, the monitoring system 40 and the receivers are configured as a microseismic monitoring system. Microseismic monitoring concerns passively monitoring a formation for seismic events which are typically very small. In passive monitoring, the formation is not interrogated, per se, but the seismic receivers are placed to receive directly any seismic waves generated by events occurring within the formation. Such events may include the seismic effects generated in a formation by fracturing, depletion, flooding, treatment, fault movement, collapse, water breakthrough, compaction or other similar subterranean interventions or effects. Monitoring seismic waves generated during a fracturing operation provides information about the operation, such as the direction and extent of the fractures being generated. The location, magnitude and moment (i.e., mechanical character) of a microseismic event are encoded in the characteristics of the radiated seismic waves.

In another example, the monitoring system 40 is configured as an active monitoring system, which includes control devices and/or processors that control injection of fluid to generate identifiable noise signals that are detected by the receivers.

Figure 2:
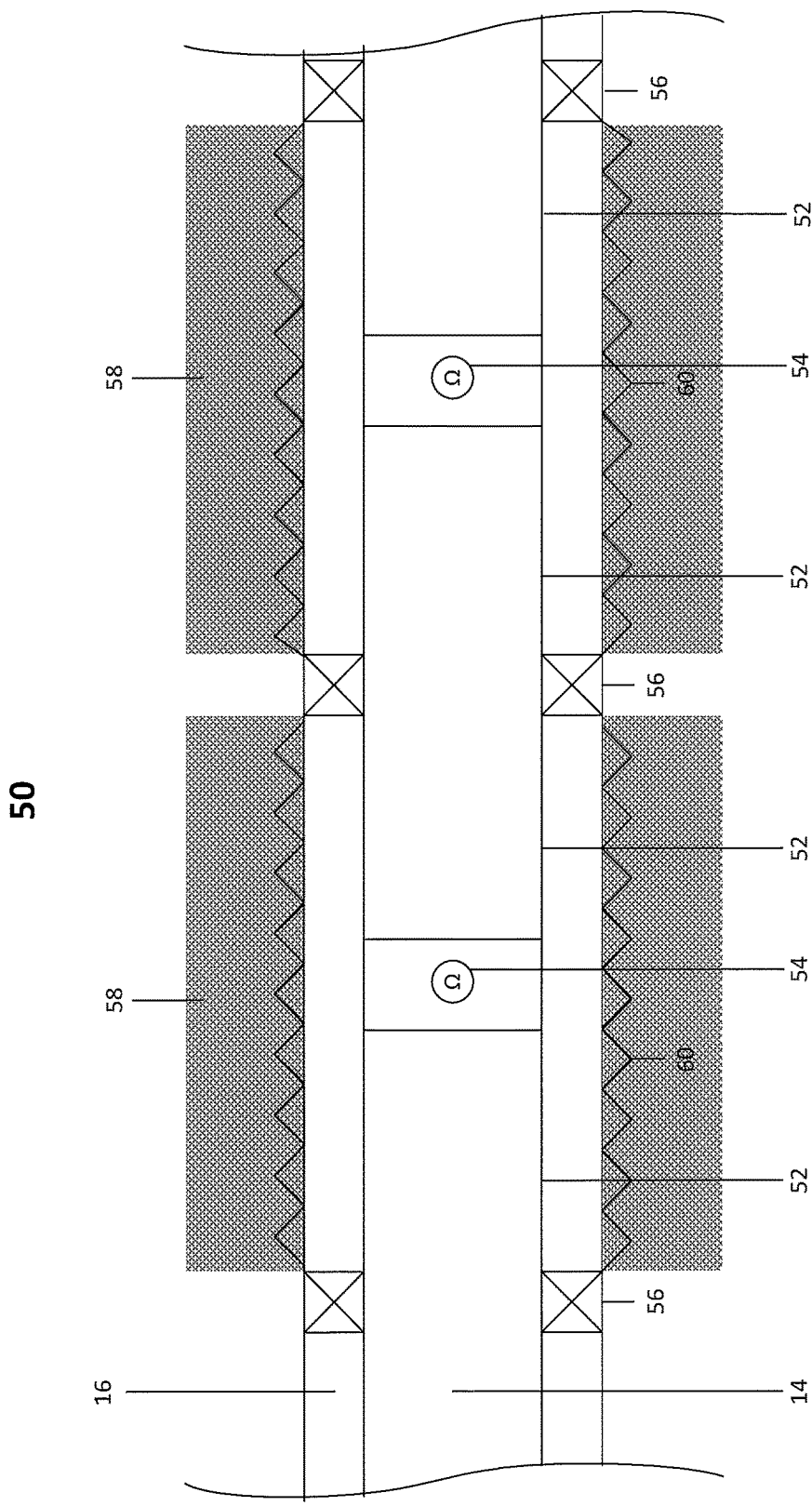
FIG. 2 depicts aspects of an embodiment of an intelligent well system.

FIG. 2 shows aspects of an embodiment of a fluid injection system 50 that is configured as part of a seismic and/or acoustic monitoring system and may be used as part of a seismic monitoring system that employs controllable sources of seismic energy. Components of the injection system 50 are disposed in a borehole such as the injection borehole 16, and are connected to a controller or processor such as the control unit 34. An injection system component may be an active or controllable component, such as an active inflow control valve (AICV), whose settings can be controlled while it is downhole. An injection system component may be a passive component, such as a passive inflow control device (ICD), whose settings are not typically modified after deployment. However, the performance of such passive devices may change as fluid flowing through the device evolves, which results in changes to generated waves.

In this example, tools, sensors and/or other components are disposed downhole in a "smart" or "intelligent" well configuration. Smart well technology involves measurement and reservoir flow control features that are disposed downhole. Installation of downhole active flow control devices, inflow control valves, measurement devices (e.g., for pressure, temperature and flow rate), and/or downhole processing facilities such as hydro-cyclones in the borehole allows for active production monitoring and control. Intelligent wells facilitate control of parameters such as fluid flow and pressure, and facilitate performing formation measurements and periodically or continuously updating reservoir models during production.

In the embodiment of FIG. 2, the injection string 14 includes tubing 52 connected to fluid control devices such as one or more flow control valves 54, through which formation fluid enters the borehole 16 and/or injection fluid enters the formation. Isolation packers 56 can be actuated to isolate sections of the borehole 16 at production zones 58 in a formation. For example, fluid is injected into the formation zone 58 via the injection tubing 52, through each flow control valve 54 into the borehole 16 and where it enters formation zone 58 through, e.g., perforations 60. The flow control valve 54 (e.g., a passive ICD or an AICV) may be a remotely controlled sliding sleeve valve or any other suitable valve or choke that can regulate the flow of injected fluid into the formation and/or the flow of formation fluid from the annulus into the production tubing 52. Additional components such as adjustable chokes in the tubing 52 may be used to regulate the fluid flow between the production zones and the surface. Each valve, choke and other such device in the well may be operated electrically, hydraulically, mechanically and/or pneumatically from the surface. In addition, each fluid control device can be operated independently to allow control of fluid flow into and from the formation at each production zone.

The flow control device/valves 54 can be operated to control the instance and characteristics of noise at various locations at a borehole and/or formation. The location or at least approximate location of noise sources can be identified by noting which device/valves or devices/valves 54 is or are being used. It is noted that, although flow control valves or other active devices are described in this embodiment, any suitable device or system used that facilitate injection of fluid or otherwise create seismic noise could be used. For example, downhole perforations may be used to generate noise sources.

Seismic and/or acoustic monitoring is performed by detecting noise events and performing interferometry to estimate properties of a formation and/or evaluate downhole operations such as stimulation and production operations. This approach satisfies the need for, e.g., continuous monitoring in which both seismic sources and receivers are buried or otherwise disposed at subterranean locations.

In one embodiment, noise generated by injectors is used as seismic and/or acoustic signals in an interferometric scheme to provide periodic, continuous or near-continuous Green's functions retrieval. The Green's function (i.e., impulse function) characterizes a medium, also referred to as a propagation medium, where variations occur. The propagation medium may be a region of a formation through which acoustic and/or seismic signals propagate. In an interferometric setup, possibly multiple diffracted waves that coherently travel from one receiver to the other can be processed (e.g., cross-correlated or deconvolved) to retrieve the Green's function between at least two receivers. There are several conditions regarding the temporal and spatial distribution of noise sources that should be met for a full reconstruction of the noise. However, even if such conditions are not met, the Green's function need not be perfectly reconstructed to perform monitoring.

The impulse response between either two (or more) observation or monitoring boreholes, or between an injection borehole and a borehole used for monitoring can be at least partially retrieved, which is sufficient to monitor changes in velocity incurred by the medium where fluids are being displaced, e.g., water displacing oil or gas displacing oil. Changes in the coda of the retrieved Green's function can be used to monitor changes in propagation velocities and performing seismic tomography to estimate characteristics of formation structure and/or monitor fluid movement.

A processor or processing device, such as the processing and/or control unit 34, is configured to at least partially estimate the the empirical Green's function between signals detected by at least two receivers, using scattered waves (coda waves) and/or ballistic waves (direct waves). Variations in the reconstructed Green's function (e.g., in the reconstructed ballistic waves and/or the reconstructed coda waves) may be observed and analyzed to estimate changes in velocity or travel time of the reconstructed waves. Such changes may be used to estimate various properties of a formation and fluid properties in the formation.

Typically, if using "seismic, ambient noise" from a formation region, one can reconstruct ballistic waves that can be properly characterized and give "exact" information—i.e. it is possible to know exactly (or with sufficient accuracy) where the changes are taking place, provided that the reconstructed ballistic waves sample the corresponding region. On the other hand, there is still information on the evolving medium even if the Green's functions are not fully recovered; the only condition, in this case, is to have stable noise sources, i.e., noise sources that do not substantially change in time or space during detection of waves by the receivers.

Figure 3:
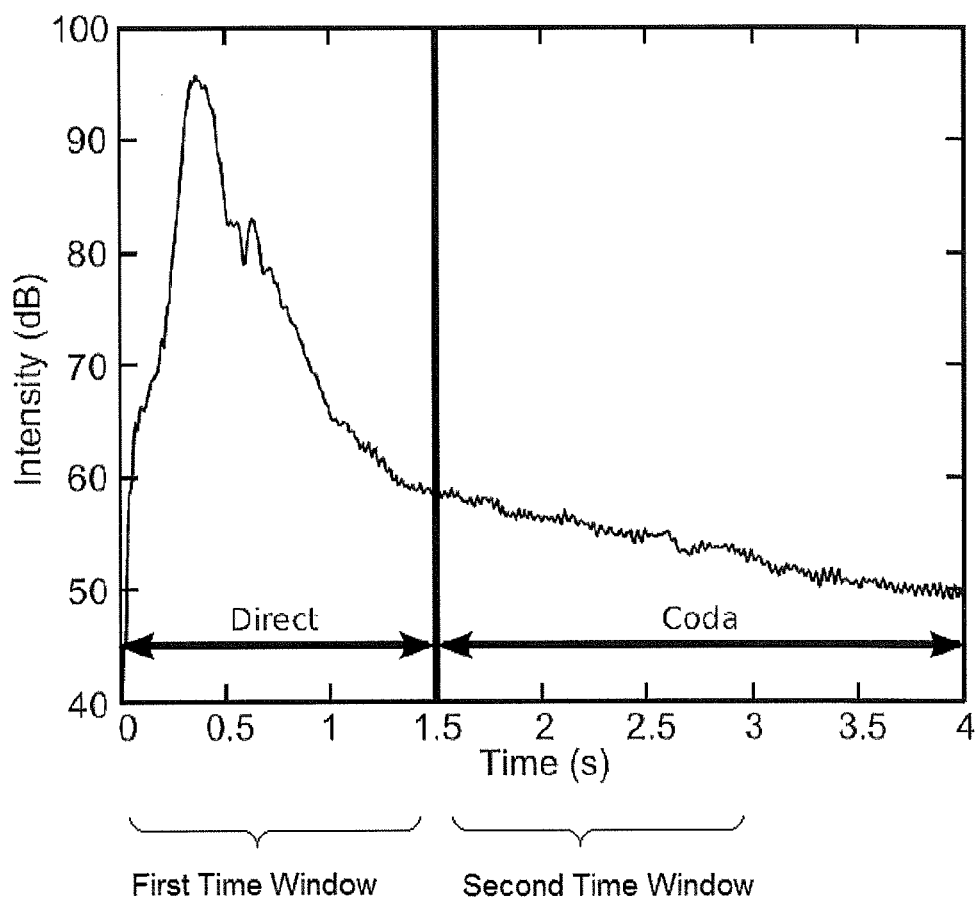
FIG. 3 depicts an example of seismic and/or acoustic signals generated by a noise source as detected by a receiver.
Figure 4:
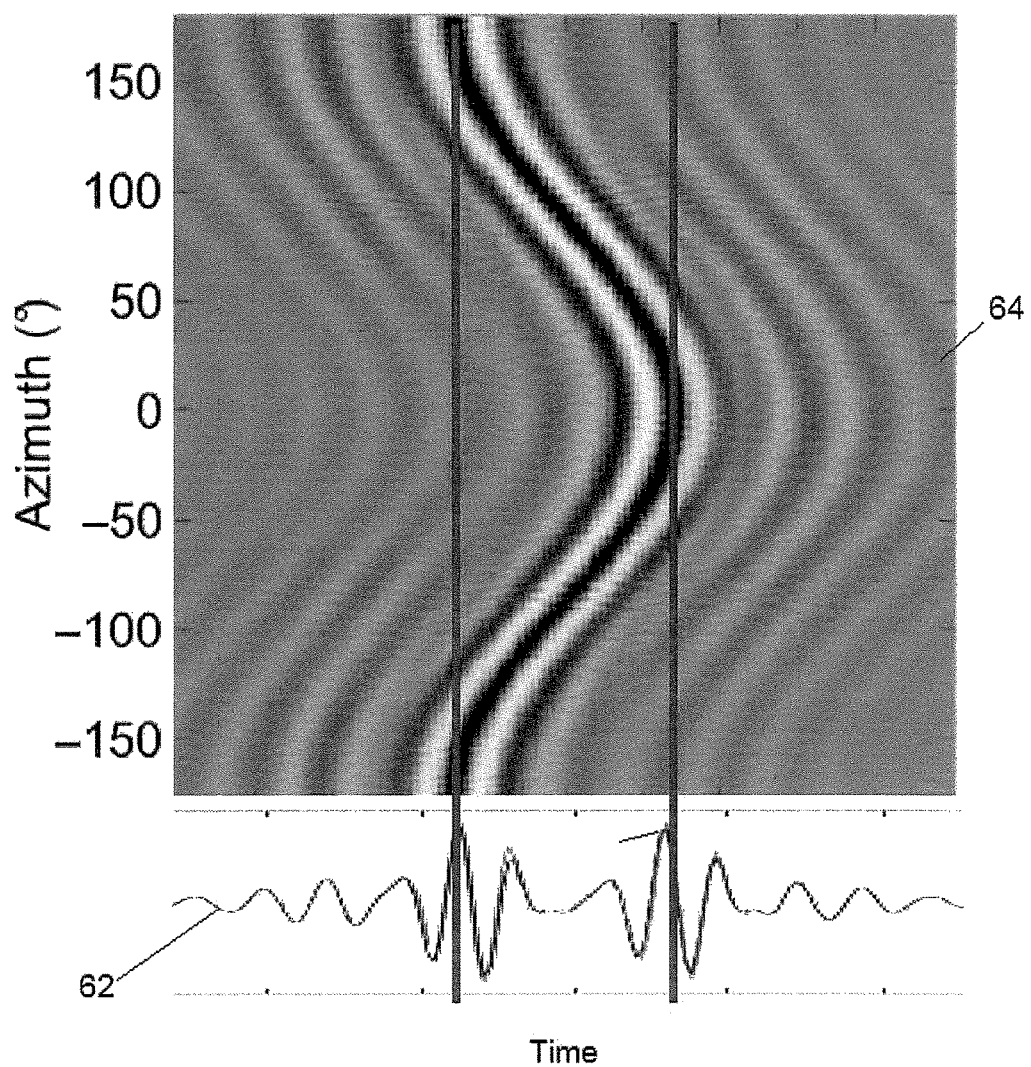
FIG. 4 depicts an example of a cross-correlation function of signals detected by a pair of receivers and associated with direct or ballistic waves generated by a noise source.
Figure 5:
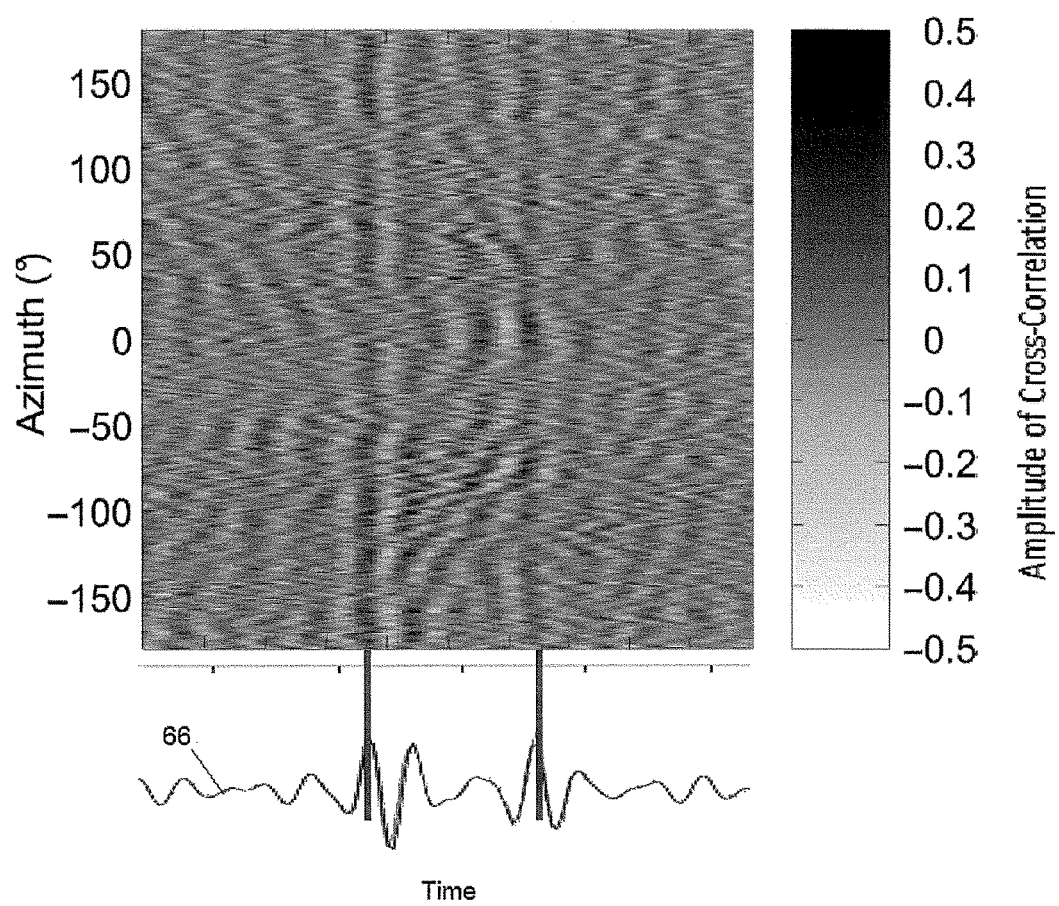
FIG. 5 depicts an example of a cross-correlation function of signals detected by a pair of receivers and associated with scattered or coda waves generated by a noise source.

FIGS. 3-5 illustrate aspects of an example of estimation of the Green's function between at least two receivers. In this example, signals are detected by a pair of receivers over a selected time window during injection and/or after injection of fluids. Each receiver generates a seismogram that may result from direct waves and/or multiply scattered or coda waves generated by a noise source. An example of a seismogram generated by a receiver is shown in FIG. 3, which can be divided into a first time window during which primarily ballistic or direct waves are detected, and a subsequent time window during which coda waves are primarily detected.

Seismograms from the pair of receivers are cross-correlated to compute the cross-correlation function. FIG. 4 shows an example of a cross-correlation function 62 as a function of time, which is computed for the first time window. This cross-correlation function is an estimate of the Green's function for direct waves generated by a noise source. Peaks in the cross-correlation function correspond to arrival times of direct waves, which vary with the geometry of the triangle formed by the noise source location and the receiver locations. This variation is shown in a plot 64 of the cross-correlation value is a function of time and azimuth of the noise source with respect to a line connecting the pair of receivers. Thus, the cross-correlation function of the direct waves is highly dependent on the location of the noise source. Knowledge of the source location can thus be used to estimate velocity or travel time.

FIG. 5 shows an example of the cross-correlation function as a function of time, which is computed for the second time window. This cross-correlation function is an estimate of the Green's function for coda waves generated by the noise source. Peaks in the cross-correlation function correspond to arrival times of the ballistic waves as reconstructed from coda. As shown in a plot of the cross-correlation function with respect to time and azimuth, the arrival time does not depend on source location. Although the Green's function for coda waves does not provide source location information, changes in the Green's function can be used to monitor changes in the formation, such as fluid migration.

Because the receivers used in the correlation process are located in a borehole, surface waves are less likely to dominate the retrieved Green's functions. Body waves are therefore likely to be reconstructed, which provides the ability to perform time-lapse three-dimensional tomography, assuming the recording arrays are located at several locations. Stability of noise sources can be ensured by the knowledge of the location of noise sources, although such knowledge is not required.

Figure 6:
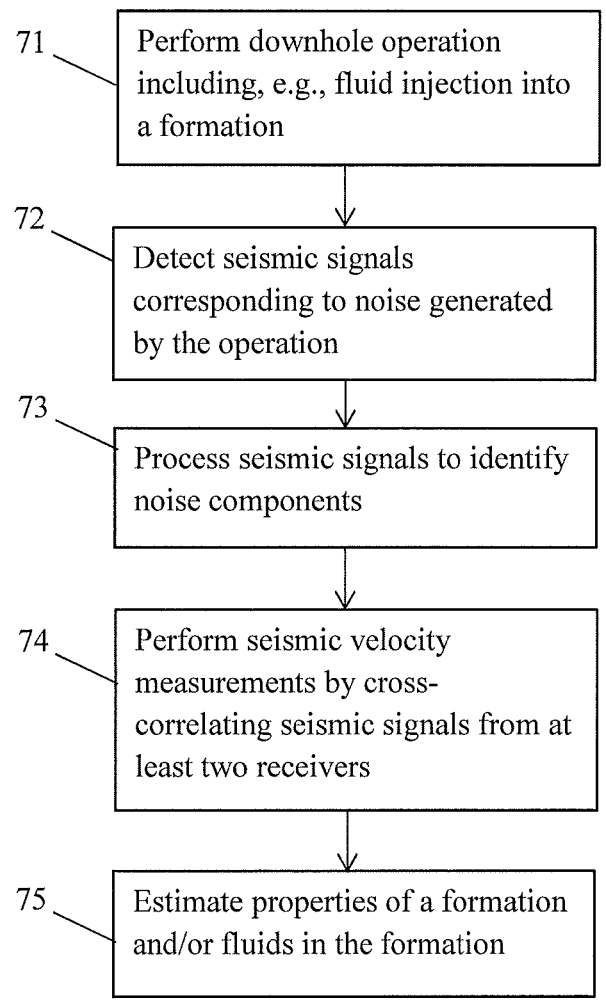
FIG. 6 is a flow chart providing an exemplary method of performing measurements of an earth formation.

FIG. 6 illustrates a method 70 for performing measurements of an earth formation. The method 70 includes performing seismic and/or acoustic measurements from a monitoring borehole or other subterranean location based on acoustic or seismic noise generated in a formation and/or borehole due to injection of fluids into a borehole and/or during production of fluids from a borehole. The method may be performed by one or more processors or processing units (e.g., the control unit 34). The method 70 includes one or more of stages 71-75 described herein. In one embodiment, the method 70 includes the execution of all of stages 71-75 in the order described. However, certain stages 71-75 may be omitted, stages may be added, or the order of the stages changed.

In one embodiment, the method 70 is performed as specified by an algorithm that allows a processor (e.g., the control unit 34) to plan an operation, control operational parameters, and collect and analyze monitoring or measurement data, among other functions. The processor as described herein may be a single processor or multiple processors (e.g., a network). For example, the control unit 34 may perform all of the functions including controlling an injection or other downhole operation, collecting seismic and/or acoustic signal data, analyzing seismic data and estimating formation properties. Alternatively, some or all of these functions may be performed individually by separate processors or processing units in communication with one another, a user or a master controller.

In the first stage 71, an injection, production or other borehole string is disposed in a first borehole in an earth formation, and an energy industry operation is performed via the first borehole. In one embodiment, the operation includes injection of fluids into the formation to, e.g., stimulate a formation and/or facilitate production. For example, a hydraulic fracturing operation is performed to stimulate production from a formation, and formation fluids resulting from this fracturing operation are produced. In another example, fluid such as water or a water-based fluid is injected into the formation to displace hydrocarbons toward one or more production boreholes. In yet another example, gas is injected to displace hydrocarbons. The first borehole is referred to herein as an injection borehole for discussion purposes, however this term is not intended to restrict the purposes for which the injection borehole is used.

Injection of fluids into reservoir causes noise, and this noise is used as an acoustic and/or seismic source for noise correlation in another borehole, such as a monitoring borehole and/or a production borehole (a producer). In one embodiment, the injection borehole includes flow control devices such as injection valves and/or inflow control valves that may be operated to control noise generation. For example, the injection borehole includes components of an intelligent well system.

Noise may be generated as an incidental consequence of the energy industry operation. For example, fluid is injected into the formation in order to stimulate production, and vibrations caused by fluid flowing into the formation and/or out of the formation (or flowing through regions of the formation) generate noise. In addition, seismic waves may be generated by fractures that are created or stimulated by the injection of fluids. This noise may be detected and analyzed as discussed further below.

In one embodiment, one or more flow control devices at known or estimated locations are controlled to inject or receive fluid according to a selected pattern or function to generate noise having identifiable characteristics. In one embodiment, the noise is controlled by operating surface or downhole control devices to generate seismic noise signals via pulses or other wave signal patterns at known times and/or at known locations. For example, the injection borehole is part of an intelligent well completion that includes flow control devices that are operated at the surface to turn injection on or off, or control fluid flow rate and/or pressure according to selected patterns.

Flow control devices may be operated to open and close positions (or choke to varying degrees). In this way, pulses of fluid injection or flow can be generated having a controllable duration and timing. Components may be operated according to any suitable regime or pattern, such as pulsing or controlling fluid flow to generate signals having known or expected frequencies, and having recognizable patterns or functions.

In the second stage 72, acoustic and/or seismic signals generated due to the operation are detected by seismic and/or acoustic sensors at one or more subterranean locations such as locations in a monitoring borehole. The monitoring borehole may be an offset well or other borehole located sufficiently close to the injection borehole to adequately detect seismic signals that can be resolved to perform estimations such as velocity measurements. In one embodiment, the monitoring borehole is a production borehole configured to produce hydrocarbons from the formation.

The monitoring borehole may be a single borehole or multiple boreholes. Thus can allow for correlation between locations in the different boreholes. For a single borehole, co-located sensors or sensors located at fixed relative positions may be correlated.

In the third stage 73, the detected seismic and/or acoustic signals are processed to identify the noise components. In one embodiment, various techniques such as filtering and smoothing techniques are employed to isolate noise components. For example, either the detected signals are correlated with reference signatures or patterns associated with the noise sources, or detected signals are filtered to isolate or detect seismic signals within a frequency range associated with noise sources.

In the fourth stage 74, seismic and/or acoustic velocity measurements are performed by cross-correlating or deconvolving noise signals detected from at least two receivers. The receivers may be located in the same borehole or located at different boreholes.

The processed seismic signals are analyzed to retrieve Green's function, which is defined as the impulse response of an inhomogeneous differential equation defined on a domain, with specified initial conditions or boundary conditions.

For example, the response observed at a first receiver at a first time and the response observed at a second receiver at a second time are cross-correlated or deconvolved to determine the Green's function response between the receivers. It is noted that the function of the detected signal may be an impulse, wavelet or other suitable function. If the first and second receivers are co-located, the responses may be considered to be auto-correlated. Auto-correlation is described in Wegler et al., "Fault zone monitoring with passive image interferometry", *Geophysical Journal International*, 168, 1029-1033 (2007), the entirety of which is hereby incorporated by reference in its entirety. The result of the cross-correlation is the Green's function between the receivers.

In one embodiment, coda waveforms are identified to estimate the velocity of body waves. The coda waveforms are associated with body wave energy imparted to the formation at a particular location. Changes in the hydrocarbon reservoir over the production life of the reservoir may be detected by changes in a formation property (e.g., fluid displacement) as indicated by temporal changes in seismic body wave characteristics or attributes. In this embodiment, coda waveforms are cross-correlated and analyzed to determine the velocity and/or estimate changes in the velocity. Examples of Green's function retrieval are described in Hadziioannou, "Stability of Monitoring Weak Changes in Multiply Scattering Media with Ambient Noise Correlation: Laboratory Experiments," *Journal of the Acoustical Society of America*, 125(6), 3688-95 (2009), the entirety of which is hereby incorporated by reference in its entirety.

The measurements described herein may be performed continuously, periodically or according to any selected temporal plan. For example, the seismic and/or acoustic noise generated by the injector borehole is continuously monitored to detect seismic and/or acoustic signals as they are received at the sensors. Measurements can be performed in real time to, e.g., control operational parameters of the injector borehole/system.

In the fifth stage 75, seismic and/or acoustic velocity measurements are used to estimate various properties or characteristics of the formation and/or of fluid in the formation. In one embodiment, velocity measurements are used to observe fluid fronts and optimize recovery. For example, velocity measurements are performed for periodic, continuous or near-continuous monitoring of the movement of a displacing fluid front, e.g., a fluid front due to water displacing oil or gas displacing oil.

In one embodiment, velocity measurements are inverted or otherwise analyzed to estimate reservoir parameters such as fluid density and/or saturation, which in turn can be used as a means to forecast water breakthrough and adapt production settings accordingly.

In one embodiment, velocity data is analyzed to monitor fluids injected into a formation during an injection operation, e.g., to track the ingress of injected fluid into the formation and/or the displacement of hydrocarbons.

In an example of an injection operation, water (which may include additional constituents) is injected via an injection borehole into a formation to displace hydrocarbons (oil and/or gas) from one region of the formation to another region, e.g., a region in which a production borehole is located. Water flow may not necessarily be uniform and thus may not be easily predictable. In some cases, as water is injected to push oil toward the production borehole, the injected water eventually "breaks through" at the production borehole, creating a channel of mostly water from the injection well to the producer. When this happens, the water cut increases drastically and the oil volume drops.

Acoustic or formation velocity estimates can be used to indicate the displacement of oil and the rate at which injected water moves through a formation, thereby allowing for identification of the location of a waterfront in the formation. For example, an increase in acoustic velocity is correlated with water displacing hydrocarbons toward a production borehole. The rate of velocity increase is correlated with displacement and thus can be correlated with the location and advancement of the waterfront, and the displacement may be extrapolated to predict when water break through will occur. This information is useful in injection operations, e.g., to control to flow rate of injection fluids and/or change locations at which fluid is injected to increase production efficiency.

The seismic and/or acoustic measurements described herein may be used in conjunction with other measurement techniques. For example, electromagnetic measurements can be taken in conjunction with seismic and/or acoustic measurements. Interferometric estimates of Green's function is applicable to other potential fields such electromagnetic fields. As the electromagnetic field is potentially more sensitive to contrasts in resistivity between water and oil, a passive electromagnetic acquisition from a borehole can be used to provide complementary information on the waterfront that is to be monitored.

FIGS. 7A-7C and 8A-8B illustrate aspects of an example of the use of acoustic wave measurements generated by noise sources to estimate or monitor changes in fluid saturation in a formation.

In a subsurface reservoir, the presence of an active injection borehole (i.e., an injector) and a production borehole (i.e., a producer) causes relative saturations of fluids to continuously change by infinitesimal degrees, along with similar changes in temperature, pressure and/or salinity in sectors of the reservoir. In this example, an acoustic monitoring system such as the monitoring system 40 is used to periodically or continuously record the travel time (e.g., compressional and/or shear travel time) between the injector and an acoustic receiver pair. The travel time and/or changes in travel time can be estimated for reconstructed ballistic body waves or reconstructed scattered waves.

Changes in sonic travel time or slowness of compressional and/or shear waves are observed due to fluid flow in the reservoir. The corresponding change in travel time is a function of the saturation of reservoir fluids, temperature, pressure, salinity of water and the API (American Petroleum Institute) gravity of oil in place. At any point in time during production, all these parameters remain dynamic. The multivariate parametric distribution changes infinitesimally with oil production and as compressional and/or shear velocity in water is higher than in oil or gas phase of hydrocarbon, the corresponding sonic travel time or slowness (typically measured in microsecond/feet or microsecond/meter) decreases considering the relative changes of pressure, temperature, salinity of reservoir and stress moduli of reservoir matrix and pore spaces as well. The infinitesimal changes of sonic travel time will add up and ultimately start to reveal the preferential domain/sectors of the reservoir, where the water saturation is changing synchronously with oil production profile in a three dimensional pattern. This, in turn, allows a processor or user to locate and track the movement of the moving waterflood front in a time-lapse manner.

Figure 7A:
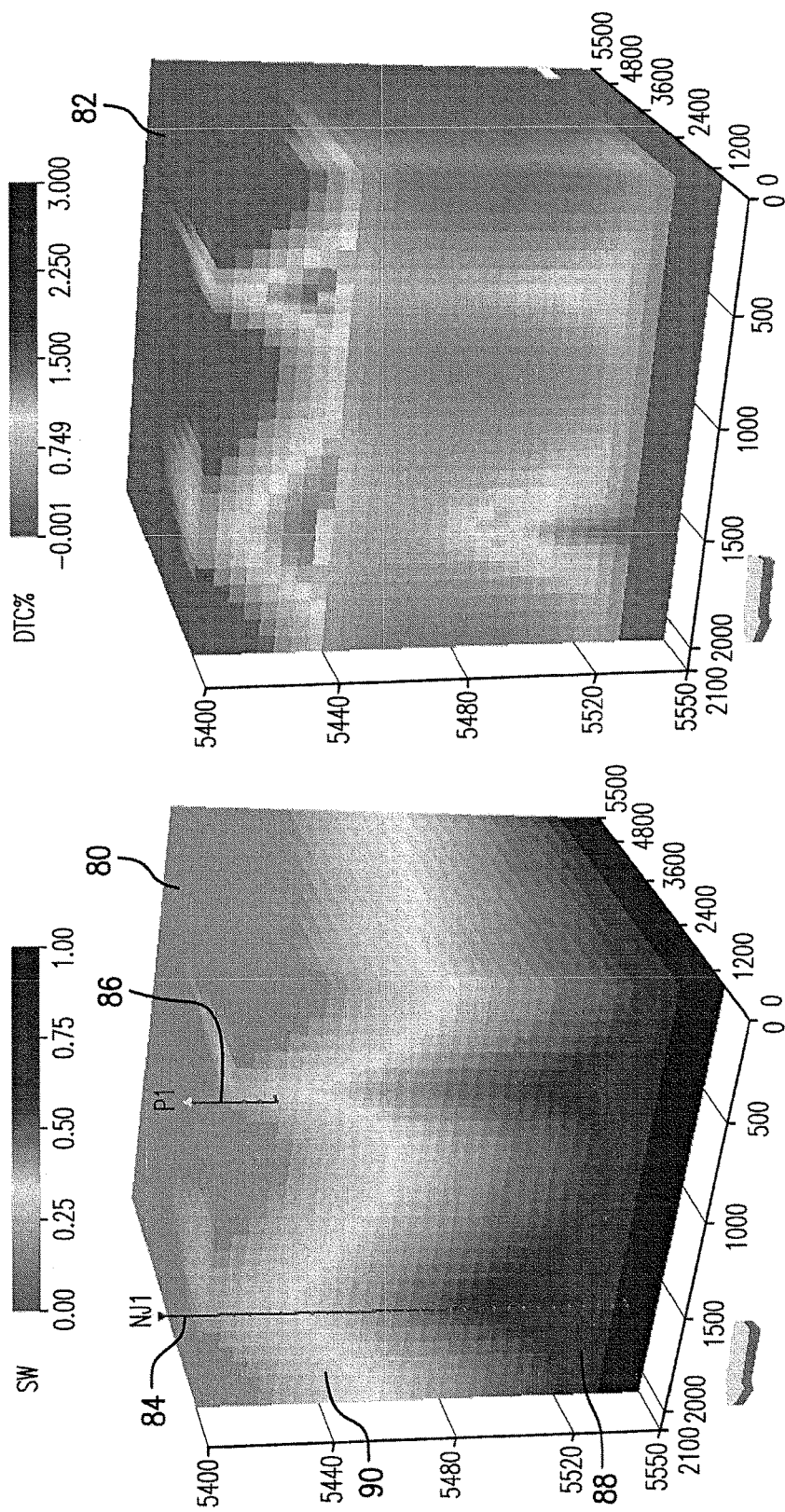
FIGS. 7A-7C depict a three-dimensional model of water saturation and a model of acoustic velocity in a sandstone reservoir.
Figure 7B:
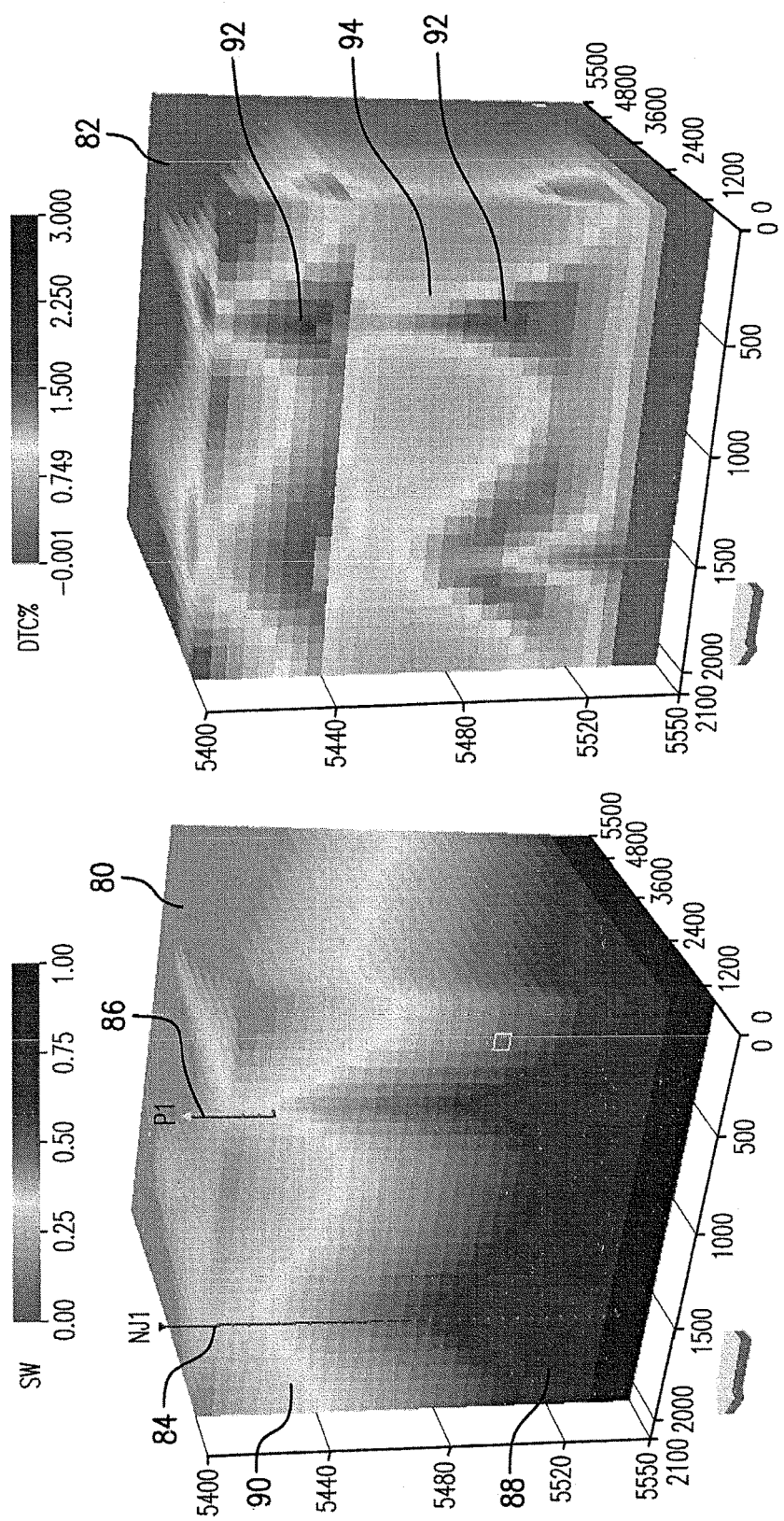
Figure 7C:
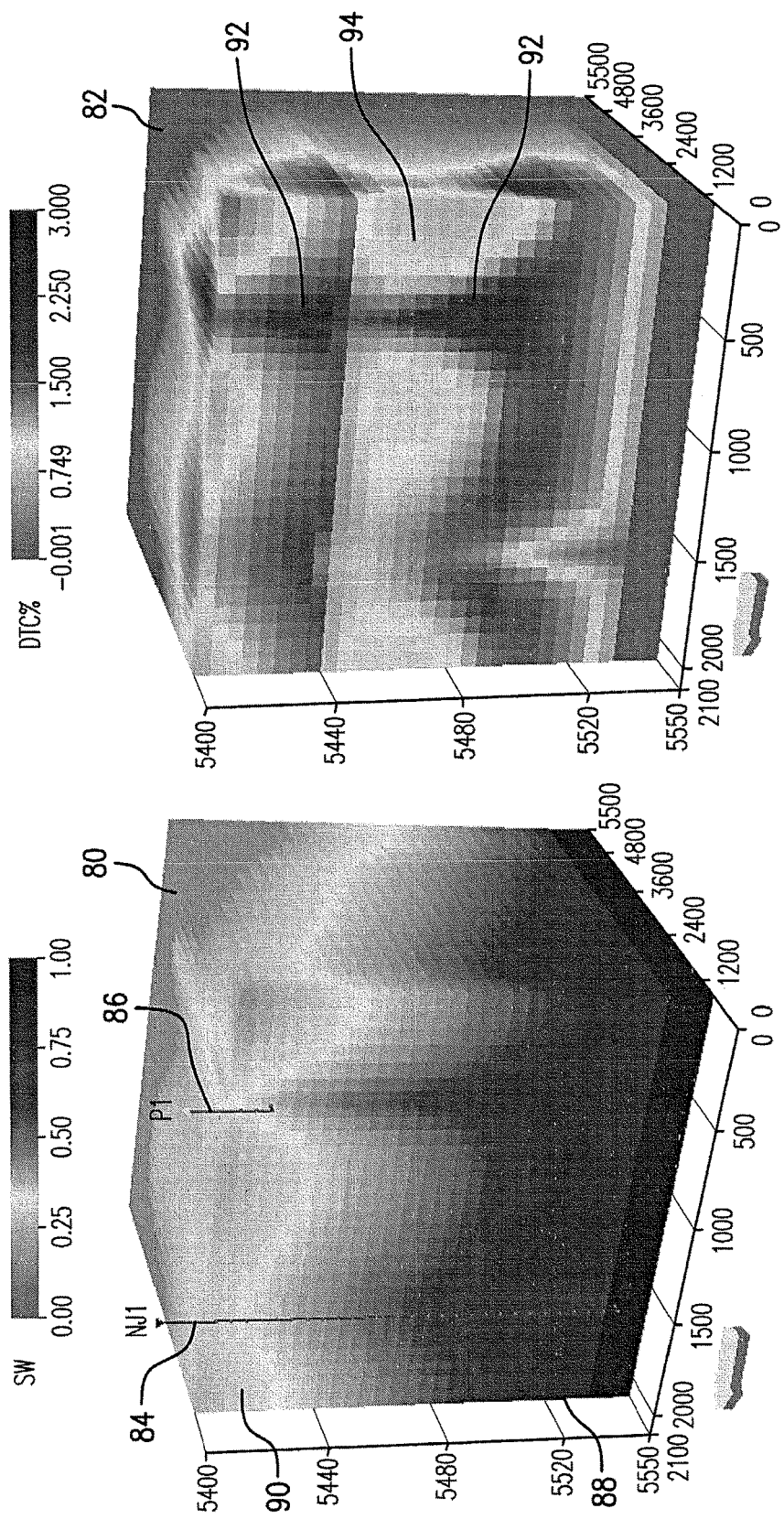

FIGS. 7A-7C show a three-dimensional model 80 of water saturation in a reservoir, and a model 82 of acoustic velocity that illustrates the correspondence between water saturation and velocity, and illustrates an example of measurements and analysis used to monitor a waterfront between an injector 84 and a producer 86. In this example, the reservoir is in a sandstone environment.

The model 80 is color-coded to show the magnitude of water saturation ($S_w$) in each cell of the model, where relatively dark regions 88 are regions of high water saturation and relatively light regions 90 are regions of low water saturation. The waterfront is shown as an interface between high saturation region(s) and low saturation region(s). The model 82 is similarly color-coded to show the magnitude of percentage change of compressional travel time (DTC), where relatively dark regions 92 are regions of high DTC percentage change and relatively light regions 94 are regions of low DTC percentage change. FIG. 7A shows the reservoir at approximately one year after the first time, FIG. 7B shows the reservoir at approximately two years after the first time, and FIG. 7C shows the reservoir at approximately three years after the first time.

Figure 8A:
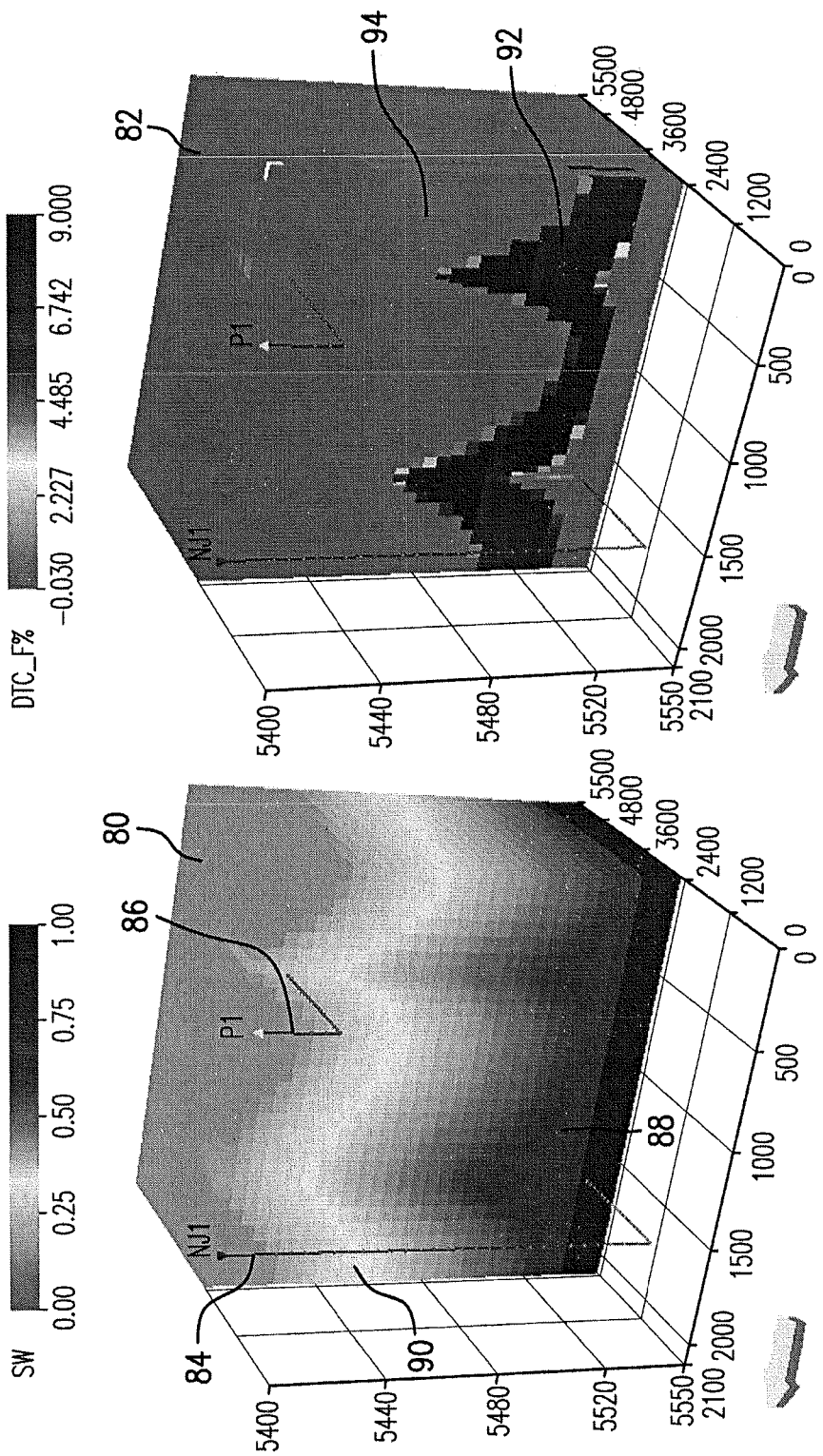
FIGS. 8A and 8B depict a three-dimensional model of water saturation and a model of acoustic velocity in a carbonate reservoir.
Figure 8B:
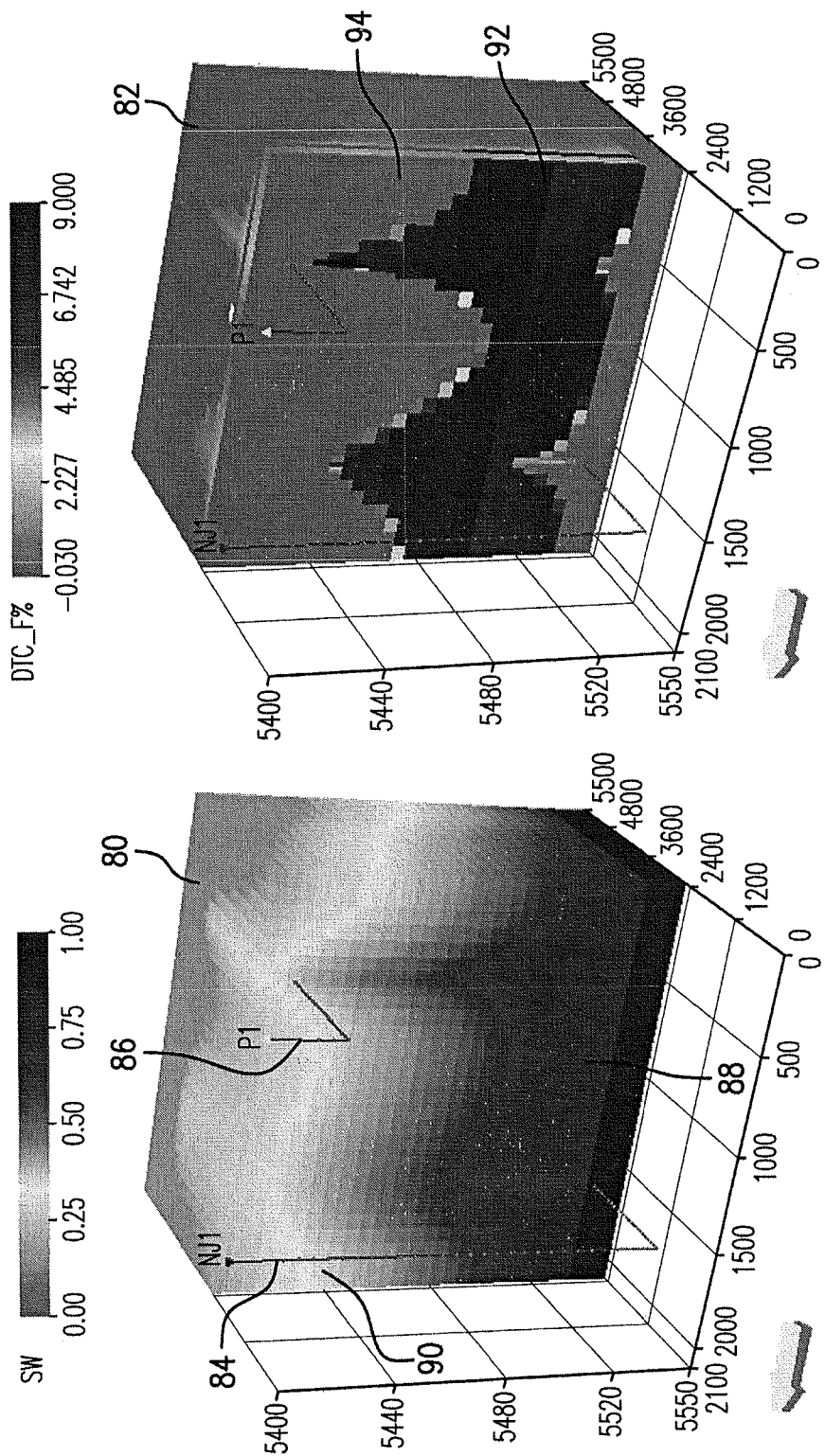

FIGS. 8A and 8B show another example of the model 80 of water saturation and the model 82 of percentage change of compressional travel time (DTC). In this example, the reservoir is in a formation made of stacked carbonate mounds, which are typically formed in shallow marine conditions. FIG. 8A shows the reservoir at approximately one year after the first time, and FIG. 8B shows the reservoir at approximately three years after the first time.

As shown in the above examples, the compressional acoustic/sonic travel time changes as the water saturation evolves with time. The percentage change in the acoustic travel time is thus a good indicator of the front flood movement as it is synchronous with evolving water saturation changes. In addition, the pattern of water saturation evolution and corresponding changes in acoustic/sonic travel time is strongly affected by the pattern and configuration of reservoir facies In addition to estimating fluid flow properties, the embodiments described herein can be used to estimate or monitor other properties or characteristics of a formation. For example, the embodiments can also be used to identify when injector operating conditions have created thermally induced fractures, which allows for identification of such conditions in order to prevent such induced fractures from occurring or occurring again. In addition, the embodiments can be used to identify when an injection process has created a formation damage a certain distance away from the injector to the producer.

Generally, some of the teachings herein are reduced to an algorithm that is stored on machine-readable media. The algorithm is implemented by a computer or processor such as the control unit 34, and provides operators with desired output.

Embodiment 1

A method of performing measurements of an earth formation, the method comprising: disposing at least a first receiver and a second receiver in one or more monitoring boreholes in an earth formation, the first receiver and the second receiver configured to detect at least one of seismic signals and acoustic signals; injecting fluid into the earth formation from an injection borehole in the earth formation during an energy industry operation, wherein injecting includes operating a fluid control device to generate seismic and/or acoustic noise having an identifiable characteristic; detecting seismic and/or acoustic signals at the first receiver and detecting seismic and/or acoustic signals at a second receiver, the seismic and/or acoustic signals corresponding to the seismic and/or acoustic noise; calculating an estimate of a Green's function between the first receiver and the second receiver by processing seismic and/or acoustic waves detected by the first receiver and the second receiver to at least partially reconstruct the seismic and/or acoustic noise; estimating variations in a velocity of a region of the formation by determining variations in the reconstructed Green's function; and evaluating the energy industry operation based on the estimated velocity.

Embodiment 2

The method of any prior embodiment, wherein estimating the Green's function includes performing one of a deconvolution and a cross-correlation of the seismic and/or acoustic waves detected by the first receiver and the seismic and/or acoustic waves detected by the second receiver.

Embodiment 3

The method of any prior embodiment, wherein performing the cross-correlation includes determining an estimate of the Green's function, and estimating the velocity includes estimating the velocity of body waves emanating from an injection location.

Embodiment 4

The method of any prior embodiment, wherein evaluating includes estimating changes in the velocity of the seismic and/or acoustic noise, and estimating progress of injected fluids in the formation based on the changes.

Embodiment 5

The method of any prior embodiment, wherein the energy industry operation is a fluid injection operation that includes injecting the fluid into the formation via the injection borehole, and producing hydrocarbons from a production borehole disposed in the formation.

Embodiment 6

The method of any prior embodiment, wherein evaluating includes monitoring displacement of formation fluids due to injection of the fluid based on the changes in the velocity.

Embodiment 7

The method of any prior embodiment, wherein evaluating includes predicting a time at which the injected fluid is expected to break through to the production borehole.

Embodiment 8

The method of any prior embodiment, wherein the fluid control device is disposed in the injection borehole at a known location during fluid injection.

Embodiment 9

The method of any prior embodiment, wherein injecting includes controlling the flow control device according to a selected pattern to generate the seismic and/or acoustic noise.

Embodiment 10

The method of any prior embodiment, wherein the injection borehole includes components of an intelligent well system including at least one flow control device.

Embodiment 11

A system for performing measurements of an earth formation, the system comprising: a fluid control device configured to control injection of fluid into an earth formation from an injection borehole as part of an energy industry operation, the fluid control device configured to be operated to generate seismic and/or acoustic noise having an identifiable characteristic; a processing device configured to perform: receiving seismic and/or acoustic signals detected during the energy industry operation by a first receiver and a second receiver disposed in one or more monitoring boreholes in the earth formation, the seismic and/or acoustic signals corresponding to the seismic and/or acoustic noise; calculating an estimate of a Green's function between the first receiver and the second receiver by processing seismic and/or acoustic waves detected by the first receiver and the second receiver to at least partially reconstruct the Green's function; estimating variations in a velocity of a region of the formation by determining variations in the reconstructed Green's function; and evaluating the energy industry operation based on the velocity.

Embodiment 12

The system of any prior embodiment, wherein estimating the Green's function includes performing one of a deconvolution and a cross-correlation of the seismic and/or acoustic waves detected by the first receiver and the seismic and/or acoustic waves detected by the second receiver.

Embodiment 13

The system of any prior embodiment, wherein performing the cross-correlation includes determining an estimate of the Green's function, and estimating the velocity includes estimating the velocity of body waves emanating from an injection location.

Embodiment 14

The system of any prior embodiment, wherein evaluating includes estimating changes in the velocity of the seismic and/or acoustic noise, and estimating progress of injected fluids in the formation based on the changes.

Embodiment 15

The system of any prior embodiment, wherein the energy industry operation is a fluid injection operation that includes injecting the fluid into the formation via the injection borehole, and producing hydrocarbons from a production borehole disposed in the formation.

Embodiment 16

The system of any prior embodiment, wherein evaluating includes monitoring displacement of formation fluids due to injection of the fluid based on the changes in the velocity.

Embodiment 17

The system of any prior embodiment, wherein evaluating includes predicting a time at which the injected fluid is expected to break through to the production borehole.

Embodiment 18

The system of any prior embodiment, wherein the fluid control device is disposed in the injection borehole at a known location during the injecting.

Embodiment 19

The system of any prior embodiment, wherein injecting includes controlling the flow control device according to a selected pattern to generate the seismic and/or acoustic noise.

Embodiment 20

The system of any prior embodiment, wherein the injection borehole includes components of an intelligent well system including at least one flow control device.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of performing measurements of an earth formation, the method comprising:
    disposing at least a first receiver and a second receiver in one or more monitoring boreholes in the earth formation, the first receiver and the second receiver configured to detect at least one of seismic signals and acoustic signals;
    injecting fluid into the earth formation from an injection borehole in the earth formation during an energy industry operation, wherein injecting includes operating a fluid control device to generate seismic and/or acoustic noise having an identifiable characteristic;
    detecting seismic and/or acoustic signals at the first receiver and detecting seismic and/or acoustic signals at a second receiver, the seismic and/or acoustic signals corresponding to the seismic and/or acoustic noise;
    calculating an estimate of a Green's function between the first receiver and the second receiver by processing seismic and/or acoustic waves detected by the first receiver and the second receiver to at least partially reconstruct the Green's function;
    estimating variations in a velocity of a region of the formation by determining variations in the reconstructed Green's function; and
    evaluating the energy industry operation based on the estimated variations in the velocity.

2. The method of claim 1, wherein estimating the Green's function includes performing one of a deconvolution and a cross-correlation of the seismic and/or acoustic waves detected by the first receiver and the seismic and/or acoustic waves detected by the second receiver.

3. The method of claim 2, wherein performing the cross-correlation includes determining an estimate of the Green's function, and estimating the variations in the velocity includes estimating a velocity of body waves emanating from an injection location.

4. The method of claim 1, wherein evaluating includes estimating changes in a velocity of the seismic and/or acoustic noise, and estimating progress of injected fluids in the formation based on the changes.

5. The method of claim 4, wherein the energy industry operation is a fluid injection operation that includes injecting the fluid into the formation via the injection borehole, and producing hydrocarbons from a production borehole disposed in the formation.

6. The method of claim 5, wherein evaluating includes monitoring displacement of formation fluids due to injection of the fluid based on the changes in the velocity.

7. The method of claim 6, wherein evaluating includes predicting a time at which the injected fluid is expected to break through to the production borehole.

8. The method of claim 1, wherein the fluid control device is disposed in the injection borehole at a known location during fluid injection.

9. The method of claim 1, wherein injecting includes controlling the flow control device according to a selected pattern to generate the seismic and/or acoustic noise.

10. The method of claim 9, wherein the injection borehole includes components of an intelligent well system including at least one flow control device.

11. A system for performing measurements of an earth formation, the system comprising:

a fluid control device configured to control injection of fluid into the earth formation from an injection borehole as part of an energy industry operation, the fluid control device configured to be operated to generate seismic and/or acoustic noise having an identifiable characteristic;

a processing device configured to perform:

receiving seismic and/or acoustic signals detected during the energy industry operation by a first receiver and a second receiver disposed in one or more monitoring boreholes in the earth formation, the seismic and/or acoustic signals corresponding to the seismic and/or acoustic noise;

calculating an estimate of a Green's function between the first receiver and the second receiver by processing seismic and/or acoustic waves detected by the first receiver and the second receiver to at least partially reconstruct the Green's function;

estimating variations in a velocity of a region of the formation by determining variations in the reconstructed Green's function; and evaluating the energy industry operation based on the estimated variations in the velocity.

12. The system of claim 11, wherein estimating the Green's function includes performing one of a deconvolution and a cross-correlation of the seismic and/or acoustic waves detected by the first receiver and the seismic and/or acoustic waves detected by the second receiver.

13. The system of claim 12, wherein performing the cross-correlation includes determining an estimate of the Green's function, and estimating the variations in the velocity includes estimating a velocity of body waves emanating from an injection location.

14. The system of claim 11, wherein evaluating includes estimating changes in a velocity of the seismic and/or acoustic noise, and estimating progress of injected fluids in the formation based on the changes.

15. The system of claim 14, wherein the energy industry operation is a fluid injection operation that includes injecting the fluid into the formation via the injection borehole, and producing hydrocarbons from a production borehole disposed in the formation.

16. The system of claim 15, wherein evaluating includes monitoring displacement of formation fluids due to injection of the fluid based on the changes in the velocity.

17. The system of claim 16, wherein evaluating includes predicting a time at which the injected fluid is expected to break through to the production borehole.

18. The system of claim 11, wherein the fluid control device is disposed in the injection borehole at a known location during the injecting.

19. The system of claim 11, wherein injecting includes controlling the flow control device according to a selected pattern to generate the seismic and/or acoustic noise.

20. The system of claim 19, wherein the injection borehole includes components of an intelligent well system including at least one flow control device.

* * * * *